United States Patent [19]

Kimura et al.

[11] Patent Number: 5,972,445
[45] Date of Patent: Oct. 26, 1999

[54] MULTILAYER POLYESTER SHEET

[75] Inventors: Hisashi Kimura, Mie-ken; Koichi Tamura, Kanagawa-ken, both of Japan

[73] Assignee: Mitsubishi Chemical Corporation, Japan

[21] Appl. No.: 09/119,060

[22] Filed: Jul. 20, 1998

Related U.S. Application Data

[63] Continuation-in-part of application No. 08/782,258, Jan. 14, 1997, abandoned.

[30] Foreign Application Priority Data

Jan. 17, 1996 [JP] Japan ..................................... 8-006086
Jan. 16, 1997 [EP] European Pat. Off. .............. 97300243

[51] Int. Cl.$^6$ ............................ B32B 27/06; B32B 27/36
[52] U.S. Cl. ........................ 428/35.4; 428/35.2; 428/35.7; 428/36.6; 428/36.91; 428/66.3; 428/212; 428/347; 525/444
[58] Field of Search .................................. 428/480, 35.7, 428/35.2, 35.4, 36.6, 36.9, 36.91, 66.3, 347; 525/444

[56] References Cited

U.S. PATENT DOCUMENTS

| | | | |
|---|---|---|---|
| 4,622,268 | 11/1986 | Yatsu et al. | 428/480 |
| 4,874,647 | 10/1989 | Yatsu et al. | 428/35.7 |
| 5,059,470 | 10/1991 | Fukada et al. | 428/142 |
| 5,115,047 | 5/1992 | Hashimoto | 525/444 |
| 5,204,181 | 4/1993 | Suzuki et al. | 428/349 |
| 5,407,752 | 4/1995 | Fukuzumi et al. | 428/480 |
| 5,458,965 | 10/1995 | Yoshinaka et al. | 428/323 |
| 5,484,632 | 1/1996 | Mercer, Jr. et al. | 428/35.7 |
| 5,628,957 | 5/1997 | Collette et al. | 264/512 |

FOREIGN PATENT DOCUMENTS

| | | |
|---|---|---|
| 0 368 278 | 5/1990 | European Pat. Off. . |
| 0 567 279 A1 | 10/1993 | European Pat. Off. . |
| 0 602 964 A1 | 6/1994 | European Pat. Off. . |
| 0 678 554 A1 | 10/1995 | European Pat. Off. . |
| 4071085732A | 3/1989 | Japan . |

*Primary Examiner*—Ellis Robinson
*Assistant Examiner*—Sandra Nolan
*Attorney, Agent, or Firm*—Nixon & Vanderhye

[57] ABSTRACT

The present invention relates to a multilayer polyester sheet comprising:

a base layer comprising a thermoplastic polyester resin (A) having a glass transition temperature of not less than 80° C., and a sealing layer comprising a thermoplastic polyester resin (B) having a glass transition temperature at least 5° C. lower than that of the base layer and laminated on at least one side of the base layer, said multilayer polyester sheet being a substantially non-stretched transparent sheet.

21 Claims, No Drawings

MULTILAYER POLYESTER SHEET

CROSS REFERENCE TO RELATED APPLICATION

This is a continuation-in-part application of U.S. application Ser. No. 08/782,258 filed on Jan. 14, 1997 now abandoned.

BACKGROUND OF THE INVENTION

The present invention relates to a multilayer polyester sheet having many favorable properties such as heat-sealing property, transparency, heat resistance, hot-water resistance, recyclability, gas barrier properties, impact resistance, scent retainability and ultraviolet screening property. More particularly, the present invention relates to the polyester sheet which is especially suited for manufacturing the containers having an excellent transparency and maintaining a high heat-sealing strength even after retort treatment thereof with hot water.

Polyesters represented by polyethylene terephthalate (PET) are widely used for various types of sheets and containers because of their many advantageous properties such as high mechanical strength, chemical stability, recyclability, transparency, gas barrier properties, moldability, etc. Recently, in view of the solution of the problems of waste disposal and environmental protection, there has been seen a remarkable expansion in use of polyesters for packing pouches, draw-formed containers, etc. for which polyvinyl chloride, polystyrene, polypropylene and the like have been predominantly used in the past. In use of polyesters for packing pouches, generally the produced pouches are cut into a proper size and then, after the stuff to be contained has been packed therein, the pouches are heat sealed. In case of using a polyester for the draw-formed containers, it is first extruded into a sheet by an extruder and then subjected to drawing to form the desired container.

However, the conventional PET sheets or the packing pouches or transparent draw-formed containers using such sheets were not well satisfactory in heat resistance because PET would be used in a non-stretched or lowly stretched state without conducting a treatment for crystallization, and they involved the problem that when the stuff to be contained and/or the ambient atmosphere was high in temperature, there could take place shrinkage or other deformations of the container such as warps or bulges of its flat portion to cause a variation of container capacity.

PET sheets were also unsatisfactory in hot-water resistance and had the problem that when they were applied to uses necessitating long-time contact with hot water such as the retort treatment for sterilization or hot filling or heating of the stuff contained, there would occur whitening or brushing of the sheet due to plasticization mostly resulting from moisture absorption of the sheet.

It has been attempted to subject the PET sheets to a stretching and orienting operation or to a crystallization treatment for improving their heat and hot-water resistance before they were used into packing pouches or transparent draw-formed containers, but in this case there arose the problem that the heat sealing property, transparency and drawing property of the sheets would be deteriorated.

PET copolymerized with cyclohexane dimethanol compound is superior to PET in heat sealing property and impact resistance but is inferior in gas barrier property, thermal stability and solvent resistance. Also, since such a copolymer is substantially equal to PET in heat and hot-water resistance, it is inapplicable, like PET, to uses such a copolymer of the case where retorting or hot filling is performed or the contained stuff is heated.

Polyethylene naphthalate (PEN) is superior to PET in heat resistance, hot-water resistance, gas barrier property and ultraviolet-screening performance but is inferior to PET in impact resistance and also bad in moldability because of high melt viscosity. In PEN, therefore, there has the problems that sheet extrudability is bad and that it is susceptible to heat deterioration and tends to form many by-products such as acetaldehyde in practical use. Also, since the glass transition temperature of PEN is high, heat sealing must be conducted at a high temperature, which may lead to a prolonged cycletime for heat sealing and occurrence of crystallization during heat sealing. PEN is also unsatisfactory in heat-sealing strength. Usually PEN copolymerized with terephthalic acid or the like has been used for improving impact resistance and moldability, but even in this copolymer, the heat-sealing strength is not improved.

As a solution to these problems, it has been proposed to alloy or laminate PET or PEN with other resins or different types of polyester. However, the alloying tends to cause phase separation and consequent whitening of the produced sheet, while the lamination may make it unable to recycle the scraps which is produced in the production line. Thus, it has been hardly possible in either way to obtain a transparent sheet at high productivity.

In view of the above, there has been available no transparent sheet comprising polyester, which is excellent in both moist heat resistance and heat-sealing property, and also recyclable in the production line.

As the result of the present inventors' earnest studies for solving above problems, it has been found that a substantially non-stretched transparent sheet produced by laminating two different types of polyethylene naphthalate resin each having its specific property, are excellent in heat resistance, hot-water resistance, heat-sealing characteristics and transparency, and also recyclable in the production line. The present invention has been attained on the basis of this finding.

SUMMARY OF THE INVENTION

The object of the present invention is to provide a polyester sheet which has excellent heat resistance and hot-water resistance, is capable of conducting retort treatment or hot filling without suffering any damage, has excellent heat-sealing property and transparency and is also recyclable in the production line, and containers made from such polyester sheet.

To accomplish the aim, in a first aspect of the present invention, there is provided a multilayer polyester sheet comprising:

a base layer comprising a thermoplastic polyester resin (A) having a glass transition temperature of not less than 80° C., and
  a sealing layer comprising a thermoplastic polyester resin (B) having a glass transition temperature of not less than 70° C. and laminated on at least one side of said base layer,
  said polyester sheet being a substantially non-stretched transparent sheet in which the heat shrinkage at 180° C. is not more than 5%, and further satisfying the followings:
    (1) said thermoplastic polyester resin (A) comprising a dicarboxylic acid moiety comprising 7 to 100 mole % of naphthalenedicarboxylic acid and 93 to 0 mole % of terephthalic acid, and a diol moiety comprising ethylene glycol;

(2) said thermoplastic polyester resin (B) comprising a dicarboxylic acid moiety comprising 4 to 90 mole % of naphthalenedicarboxylic acid and 96 to 10 mole % of terephthalic acid, and a diol moiety comprising 50 to 97 mole % of ethylene glycol and 50 to 3 mole % of at least one selected from the group consisting of cyclohexane dimethanol, diethylene glycol and 1,4-butanediol;

(3) the haze of the whole multilayer polyester sheet is not more than 10%; and (4) the total thickness of the sealing layer is 1 to 30% based on the thickness of the base layer.

In a second aspect of the present invention, there is provided a packaging container produced by heat-sealing the multilayer polyester sheet defined in the first aspect.

In a third aspect of the present invention, there is provided a molded article obtained by drawing the multilayer polyester sheet defined in the first aspect.

In a fourth aspect of the present invention, there is provided a heat-sealable container cover comprising the multilayer polyester sheet defined in the first aspect.

In a fifth aspect of the present invention, there is provided a packaging container produced by heat-sealing a cover to a draw-formed article obtained by drawing the multilayer polyester sheet defined in the first aspect.

DETAILED DESCRIPTION OF THE INVENTION

The present invention is described more detail.

The multilayer polyester sheet (which may hereinafter be referred to simply as sheet) of the present invention is substantially non-stretched sheet. More specifically, the process of producing the multilayer polyester sheet according to the present invention includes no step of stretching the sheet, and the multilayer sheet is specified to have a heat shrinkage percentage at 180° C. of not more than 5%, preferably not more than 3%, more preferably not more than 2%. If the multilayer sheet is stretched and its heat shrinkage percentage is more than 5%, there may take place no sufficient drawdown in the succeeding molding operation, resulting in poor molding and shaping performance, so that such a multilayer sheet is unusable for the intended purpose. In the measurement of heat shrinkage percentage, any influence of heat shrinkage caused by thermal crystallization should be excluded. The "stretching step" means any operation of monoaxially or biaxially stretching polyester that has conventionally been practiced in the art. A slight degree-molding strain or -orientation that could be caused when the molten resin discharged from a die is taken up by a cooling roll during extrusion molding, is not included in the conception of "stretching" in the present invention.

The multilayer polyester sheet according to the present invention comprises a base layer and a sealing layer laminated on at least one side of the said base layer. The overall thickness of the multilayer polyester sheet may be set optionally, but it usually falls in the range from 0.02 to 3 mm, preferably from 0.04 to 2 mm, more preferably from 0.05 to 1.2 mm, because when the overall thickness of the said sheet is within the above range, the sheet shows good moldability and excellent shape retainability.

The total thickness of the sealing layer is 1 to 30%, preferably 3 to 25%, more preferably 4 to 20%, still more preferably 5 to 15% based on the thickness of the base layer and is preferably not less than 1 μm.

If the total thickness of the sealing layer is less than 1% based on the thickness of the base layer, the obtained sheet may be low in heat-sealing strength and impact resistance. On the other hand, when the total thickness of the sealing layer is more than 30% based on the thickness of the base layer, the produced multilayer sheet may be poor in moldability and may also turn out too high in heat-sealing strength or too low in yield strength.

In case where the total thickness of the sealing layer is not more than 30% based on the thickness of the base layer, there can be obtained an economical advantage in that whitening of the sheet can be prevented when the edge, fragment and surplus portions of the sheet produced during the sheet-molding operation (the trimmings) are recycled in the production line by adding to the base layer material.

The degree of crystallinity of the multilayer polyester sheet according to the present invention is not more than 15%, preferably not more than 10%, more preferably not more than 5%, still more preferably not more than 3%, in the entirety of the sheet. When the degree of crystallinity is more than 15%, the moldability, transparency and heat-sealing property of the sheet may be poor.

The degree of crystallinity is calculated from the value of amorphous density and the value of crystal density determined by measuring the density of the multilayer polyester sheet. Conventional methods such as displacement technique, density-gradient tube technique, dry density measuring method, etc., can be used for the measurement of density of the polyester sheet. The amorphous density can be determined by measuring a density of a test piece prepared by followings, melting the multilayer sheet and then immediately dipping it in a coolant such as liquid nitrogen to effect rapid cooling. As for the values of crystal density, those mentioned in the known literature can be referred to. Crystal density differs depending on the type of polyester chain constituting the crystal and the type of crystal (orientation crystal or spherulite crystal), but usually there is used the value of 1.406 g/cm$^3$ for polyethylene naphthalate crystal and 1.457 g/cm$^3$ for polyethylene terephthalate crystal (Polymer Handbook, 3rd Edition, WILEY).

As for the haze of the multilayer polyester sheet of the present invention, the haze measured in the thickness direction of the sheet is not more than 10%, preferably not more than 8%, more preferably not more than 6%, still more preferably not more than 5%. When the haze of the multilayer polyester sheet is more than 10% due to too much addition of additives or incompatibility of the polyester of the sealing layer with that of the base layer, the sheet or its molded articles may become unsatisfactory in transparency.

Oxygen permeability of the multilayer polyester sheet of the present invention is not specified, but it is usually not more than 4.5 cc·mm/[m$^2$·day·atm], preferably not more than 3.0 cc·mm/[m$^2$·day·atm], more preferably not more than 2.0 cc·mm/[m$^2$·day·atm]. When the oxygen permeability of the sheet is within the above-defined range, the sheet shows good gas barrier property and can retain aroma when an aromatic substance is packed in the container made of the multilayer polyester sheet.

The multilayer polyester sheet according to the present invention is described in detail below. All of the materials shown in the following may be used in the form of an ester-forming derivative when they are in the stage of monomer.

The thermoplastic polyester resin (A) constituting the base layer of the multilayer polyester sheet of the present invention comprises polyethylene naphthalate or polyethylene naphthalate copolymer. Polyethylene naphthalate is a polyester principally composed of naphthalenedicarboxylic acid and ethylene glycol.

The thermoplastic polyester resin (A) comprises a dicarboxylic acid moiety comprising usually 7 to 100 mole %, preferably 10 to 100 mole %, more preferably 20 to 100 mole %, still more preferably 50 to 100 mole %, most preferably not 70 to 100 mole % of naphthalenedicarboxylic acid and usually not more than 93 mole % (93 to 0 mole preferably not more than 90 mole % ( 90 to 0 mole more preferably not more than 80 mole % (80 to 0 mole %), still more preferably not more than 50 mole % (50 to 0 mole %), most preferably not more than 30 mole % (30 to 0 mole %) of terephthalic acid, and a diol moiety comprising ethylene glycol.

When terephthalic acid is copolymerized at a percentage of more than 93 mole %, the produced sheet may prove poor in heat resistance and moist heat resistance.

The base layer of the multilayer polyester sheet according to the present invention may be formed by blending such polyethylene naphthalate and polyethylene naphthalate copolymer in the said percentage.

The thermoplastic polyester resin (B) constituting the sealing layer of the multilayer polyester sheet according to the present invention, comprises a dicarboxylic acid moiety comprising usually 4 to 90 mole %, preferably 8 to 90 mole %, more preferably 15 to 90 mole %, still more preferably 40 to 90 mole %, most preferably 60 to 90 mole % of naphthalenedicarboxylic acid and usually 96 to 10 mole %, preferably 92 to 10 mole %, more preferably 85 to 10 mole %, still more preferably 60 to 10 mole %, most preferably 40 to 10 mole % of terephthalic acid, and a diol moiety comprising usually 50 to 97 mole %, preferably 60 to 90 mole % of ethylene glycol and usually 50 to 3 mole %, preferably 40 to 10 mole % of at least one selected from the group consisting of cyclohexane dimethanol, diethylene glycol and 1,4-butanediol.

When the amount of naphthalenedicarboxylic acid used is less than 4 mole %, the produced sheet may be unsatisfactory in heat resistance and hot-water resistance, and when the said amount is more than 90 mole %, the base layer of the produced polyester sheet may be deformed at the temperature of softening the sealing layer when the sheet is heat-sealed.

When the amount of ethylene glycol used is less than 50 mole %, reactivity of the monomer may lower. When the amount of ethylene glycol used is more than 97 mole %, heat-sealing characteristics of the resin may be deteriorated. It is preferable that the diol component other than ethylene glycol be selected from at least one selected from the group consisting of cyclohexane dimethanol, ethylene glycol and 1,4-butanediol, because in this case heat-sealing characteristics are excellent.

The thermoplastic polyester resin (B) constituting the sealing layer may be a blend of a polyethylene naphthalate resin and polyethylene terephthalate copolymer in the said percentage.

When the thermoplastic polyester resin (B) comprises the said blend, the composition of the blend is optional as far as the above percentage is satisfied, but it is preferable that the composition is composed of 20 to 80 wt %, preferably 30 to 75 wt %, more preferably 50 to 70 wt % of polyethylene naphthalate resin and 80 to 20 wt %, preferably 70 to 25 wt %, more preferably 50 to 30 wt % of polyethylene terephthalate copolymer. When the amount of the copolymer polyethylene terephthalate is less than 20 wt %, the produced sheet may be unsatisfactory in heat sealing characteristics and transparency, while when its amount is more than 80 wt %, the obtained sheet may be poor in heat resistance, hot-water resistance and transparency.

In case where the sealing layer comprises the said blend, the polyethylene naphthalate resin used as a component thereof may be a polyester of the same type as the thermoplastic polyester resin (A) used for the base layer.

As the naphthalenedicarboxylic acid used in the thermoplastic polyester resin (A) forming the base layer, the thermoplastic polyester resin (B) forming the sealing layer or polyethylene naphthalate resin in case of the sealing layer composed of the said blend, there can be used various types of naphthalenedicarboxylic acid such as 2,6-, 2,7-, 1,4-, 1,5-, 1,8- and 2,3-naphthalenedicarboxylic acids, and these naphthalenedicarboxylic acids may be used either singly or in combination. Of these naphthalenedicarboxylic acids, 2,6- and 2,7-naphthalenedicarboxylic acids are preferred, and further, 2,6-naphthalenedicarboxylic acid is most preferred.

In case where the sealing layer comprises the said blend, the polyethylene terephthalate copolymer is a polyester principally composed of terephthalic acid and ethylene glycol. The copolymerization percentage of the copolymer moiety is usually 2 to 50 mole %, preferably 5 to 50 mole %, more preferably 10 to 45 mole %, still more preferably 15 to 40 mole %. Here, the "copolymerization percentage" means the ratio of the other dicarboxylic acid components than terephthalic acid to the whole dicarboxylic acid plus the ratio of the other diol components than ethylene glycol to the whole diol. When the copolymerization percentage is more than 50 mole %, the produced sheet may be impaired in transparency, and when the ratio is less than 2 mole %, the produced sheet may be deteriorated in heat-sealing properties.

It is preferable that the diol contains 50 to 97 mole %, preferably 60 to 90 mole % of ethylene glycol and 50 to 3 mole %, preferably 40 to 10 mole % of at least one selected from the group consisting of cyclohexane dimethanol, diethylene glycol and 1,4-butanediol. When ethylene glycol is contained in the above-defined range, the reactivity of monomer is good and the heat-sealing properties of the sheet is excellent.

The polyesters used in the present invention may contain comonomers within limits not prejudicially to the object of the present invention.

The comonomers include bifunctional dicarboxylic acids, for example, aromatic dicarboxylic acids such as phthalic acid, isophthalic acid, terephthalic acid, naphthalenedicarboxylic acid, 4,4'-diphenylsulfonedicarboxylic acid and 4,4'-biphenyldicarboxylic acid, alicyclic dicarboxylic acids such as 1,4-cyclohexanedicarboxylic acid, aliphatic dicarboxylic acids having aromatic rings such as 1,3-phenylenedioxydiacetic acid, and aliphatic dicarboxylic acids such as adipic acid, sebacic acid and diglycolic acid; and bifunctional diols, for example, aliphatic diols such as ethylene glycol, diethylene glycol, 1,2-propanediol, 1,3-propanediol, 1,4-butanediol, 1,6-hexanediol, neopentyl glycol and 2-butyl-2-ethyl-1,3-propanediol, alicyclic diols such as 1,4-cyclohexane dimethanol, aromatic diols such as bisphenol A and bisphenol S, and condensates thereof with aliphatic diols. Polyethers such as polyethylene glycol, polytetramethylene glycol, etc., may be copolymerized in limited amount as the bifunctional diol moiety. Further, p-hydroxybenzoic acid, glycolic acid and the like can be used as oxycarboxylic acid in the copolymer composition.

Regarding the comonomer percentage of diethylene glycol, it is preferable that the ratio of the feedstock polyesters to the whole diol moiety is not more than 5 mole %, preferably not more than 4 mole %, more preferably not more than 3 mole %. When the copolymer percentage of diethylene glycol is within this range, the produced sheet has high thermal stability and also the molded articles from this sheet are improved in thermal deformation resistance.

In case where a polyether is contained as comonomer components, it should be used in an amount range in which the haze of the produced sheet is not more than 10%.

Also, in the comonomers of the polyester resin, small amount of trifunctional or polyfunctional substances may be contained within limits not prejudicially to the effect of the present invention. Such polyfunctional substances include polyvalent carboxyl substances such as trimellitic acid, trimesic acid and pyrromellitic acid, and their anhydrides, polyvalent hydroxyl substances such as trimethylolethane, trimethylolpropane, glycerin and pentaerythritol, and glycidyl ethers of aromatic dihydroxyl compounds such as bisphenol A diglycidyl ether and bisphenol S diglycidyl ether. In case where such a polyfunctional substance is used, its amount is limited to a range in which no gelation substantially progresses. Specifically, it is preferable that a polyfunctional substance be contained in an amount of not more than 1.0 mole %, preferably not more than 0.6 mole %, more preferably not more than 0.3 mole %, based on the whole monomer units composing the polyester. Presence of a small amount of a polyfunctional substance such as mentioned above tends to reduce the degree of drawdown of the sheet in drawing thereof.

Also, a small amount of a monofunctional substance may be copolymerized in the polyester within limits not prejudicially to the effect of the present invention. Examples of the monofunctional substances usable in the present invention include benzoic acid, t-butylbenzoic acid, benzoylbenzoic acid, stearic acid, benzyl alcohol, stearyl alcohol and the like. Such a monofunctional substance is not an essential component, but when it is used, its amount is usually in the range of 0.005 to 1.0 mole %, preferably 0.01 to 0.75 mole % based on the whole monomer units constituting the polyester. Presence of a monofunctional substance such as mentioned above tends to enhance thermal stability of the resin during sheet molding.

As the comonomers used for the thermoplastic polyester resin (A) constituting the base layer and used for the polyethylene naphthalate resin in case where the sealing layer comprises a composition, there can be preferably used terephthalic acid, isophthalic acid, diethylene glycol, neopentyl glycol, 1,4-cyclohexane dimethanol and the like. Among of them terephthalic acid, isophthalic acid and diethylene glycol are especially preferred.

As the comonomers used for the thermoplastic polyester resin (B) constituting the sealing layer, there can be preferably used dicarboxylic acids such as terephthalic acid, isophthalic acid, 1,4-cyclohexane dicarboxylic acid and the like. As diols other than ethylene glycol, 1,4-cyclohexane dimethanol, diethylene glycol and 1,4-butanediol, there can preferably be used 1,3-propanediol, neopentyl glycol, 2-butyl-2-ethyl-1,3-propanediol and the like.

As for the comonomers used for the polyethylene terephthalate copolymer in case where the sealing layer comprises a composition, isophthalic acid, 1,4-cyclohexane dicarboxylic acid and the like can be preferably used as dicarboxylic acid. As diols other than ethylene glycol, 1,4-cyclohexane dimethanol, diethylene glycol and 1,4-butanediol, there can be preferably used 1,3-propanediol, neopentyl glycol, 2-butyl-2-ethyl-1,3-propanediol and the like.

In the feedstock polyesters are contained the elements other than those constituting the polymer molecule, for example, metal elements such as manganese, magnesium, cobalt, zinc, antimony, germanium and titanium originating in the polycondensation catalyst used in the preparation of the polyesters and phosphorus element originating in the stabilizer. The type and amount of the polycondensation catalyst used in the present invention are not specified as far as they meet the requirements of the present invention, but in view of color tone of the sheet, the polyesters containing antimony or germanium as polycondensation catalyst are preferably used.

In the multilayer polyester sheet of the present invention, proper additives may be contained within limits not impairing the effect of the present invention.

Additives usable in the present invention include hindered phenolic, phosphoric and thioethereal antioxidants, lubricants-such as calcium carbonate and silica, releasing agent, flame retardant, thermal stabilizer, anti-hydrolytic agent, antistatic agent, hard coating agent, ultraviolet absorber, light stabilizer, fluorescent brightener, etc. These additives may be added in the form as they are or in the state of masterbatch at the time of molding of the multilayer sheet, or may be added in the polymerization process. Also, they may be added during surface treatment of the sheet by such means as coating or lamination to form a surface layer or an intermediate layer of the multilayer polyester sheet.

Intrinsic viscosity of the polyesters used in the present invention is usually in the range of 0.5 to 1.3 dl/g, preferably 0.55 to 1.1 dl/g, more preferably 0.6 to 1.0 dl/g. When intrinsic viscosity of the polyesters falls in the said range, the produced multilayer sheet has excellent moldability and heat-sealing property, and the molded articles from this sheet are improved in impact resistance. Measurement of intrinsic viscosity was conducted by dissolving 0.25 g of sample in 25 ml of a phenol/1,1,2,2-tetrachloroethane (1/1 by weight) mixed solvent and measuring the viscosity of this solution at 30° C.

The thermal properties of the polyesters used for the multilayer polyester sheet of the present invention were represented by the glass transition temperature measured by a differential scanning calorimeter (DSC).

The thermoplastic polyester resin (A) constituting the base layer of the multilayer polyester sheet according to the present invention has a glass transition temperature of not less than 80° C., preferably not less than 90° C., more preferably not less than 100° C., still more preferably not less than 110° C. If the glass transition temperature of the thermoplastic polyester resin (A) is less than 80° C., the produced base layer of the sheet may be poor in heat resistance and hot-water resistance.

The glass transition temperature of the thermoplastic polyester resin (B) constituting the sealing layer is not less than 70° C. and preferably 5° C. or more, more preferably 10° C. or more, still more preferably 15° C. or more lower than the glass transition temperature of the thermoplastic polyester resin (A). If the difference of glass transition temperature between the thermoplastic polyester resin (A) and the thermoplastic polyester resin (B) is less than 5° C., the base layer is deformed when the sheet is heat-sealed.

The glass transition temperature of the thermoplastic polyester resin (B) constituting the sealing layer is preferably not more than 120° C. If the glass transition temperature is more than 120° C., the produced sheet may deteriorate in heat-sealing properties.

In case where the sealing layer of the multilayer polyester sheet of the present invention is constituted by a composition, it is preferable that the glass transition temperature (Tg) defined by the following formula (1) falls in the range of 90 to 120° C., preferably 95 to 117° C., more preferably 100 to 115° C.:

$$1/Tg = W_{PEN}/Tg_{PEN} + W_{PET}/Tg_{PET} \quad (1)$$

wherein $Tg_{PEN}$: glass transition temperature of the polyethylene naphthalate resin;

$Tg_{PET}$: glass transition temperature of the polyethylene terephthalate copolymer;

$W_{PEN}$: blending ratio (weight ratio) of the polyethylene naphthalate to the sealing layer;

$W_{PET}$: blending ratio (weight ratio) of the polyethylene terephthalate copolymer to the sealing layer.

When Tg defined by the formula (1) falls within the above range, the produced multilayer sheet of the present invention is excellent in heat-sealing properties, heat resistance, hot-water resistance, moldability and transparency after retorting. If the above-defined Tg is less than 90° C. or more than 120° C., the produced sheet may fail to possess the desired amounts mentioned above.

Glass transition temperature was determined in the following way. A test piece cut out from each sample sheet during giving as little shear as possible was heated at a heating rate of 20° C./min from room temperature till reaching 300° C. under a nitrogen gas atmosphere, kept at 300° C. for 3 minutes, quenched rapidly with liquid nitrogen and then again heated at a heating rate of 20° C./min from room temperature till reaching 300° C., by use of DSC. Glass transition temperature is determined from the specific heat changing behavior due to glass transition on the calorific value curve at the stage of re-heating. More specifically, the glass transition temperature is the temperature at the crossing point of the tangential line at the intermediate point of specific heat change due to glass transition and the tangential line at a point before specific heat change. In the case of PET, the glass transition temperature is 78° C.

The methods for producing the feedstock polyesters and a sheet made therefrom according to the present invention are explained.

The feedstock polyesters in the present invention can be produced according to the conventional methods comprising melt polymerization, succeeding drying and crystallization steps, which may be further followed by solid-state polymerization.

Various methods are available for melt polymerization of the polyesters. For example, direct esterification reaction is carried out using dicarboxylic acids and diols, and then the temperature is raised while gradually reducing pressure to conduct polycondensation reaction, or transesterification is carried out using an ester derivative of a dicarboxylic acid and a diol, and the reaction product is further subjected to polycondensation reaction.

Drying of the reaction product can be accomplished in an inert gas (such as nitrogen gas) atmosphere or an air atmosphere or under reduced pressure. The operating temperature is usually 120 to 220° C. in the case of crystalline polyester and not more than glass transition temperature of the polyester in the case of amorphous polyester. By conducting drying, the thermal decomposition of the polyester during sheet molding can be prevented. In the case of crystalline polyester, crystallization can be effected simultaneously with the drying.

Solid-state polymerization of the obtained polyester can be performed in an inert gas (such as nitrogen gas) atmosphere or under reduced pressure following the said drying and crystallization of the crystalline polyester. The operating temperature is usually 200 to 250° C. By carrying out the solid-state polymerization, it is possible to obtain a polyester having higher intrinsic viscosity.

The multilayer polyester sheet of the present invention can be produced by using a die-incorporated extruder or a laminator which has been used for sheet molding of polyester. As for the molding procedure, one of the base layer or the sealing layer may be first molded without stretching, and then the other layer may be extrusion-laminated or -coated, or both of the base layer and the sealing layer may be simultaneously coextruded as a 2-material 2-layer sheet or a 2-material 3-layer sheet by a sheet molding machine provided with a side extruder. Also, the non-stretched sheets of a base layer and a sealing layer are produced separately, and these non-stretched sheets may be laminated directly or dry laminated using an adhesive agent. Among the above, the coextrusion is preferred because of excellent strong adhesion between the two layers.

There is known a sheet forming method in which the fine polyester particles are suspended in water or an aqueous solution and this suspension is applied on the base layer and dried to form a surface layer. However, use of this method in the present invention is not preferable because when the sealing layer of the multilayer polyester sheet of the present invention is formed by using this method, it is difficult to obtain the sealing layer of a prescribed thickness, the production cost elevates because of the increased number of the production steps, and also the produced sealing layer of the sheet is poor in heat-sealing strength. But this does not hold true in case where this method is used for forming an additional coating layer on the multilayer sheet surface after forming the base layer and the sealing layer by extrusion lamination or coextrusion, or in case the method is used for forming a coating layer on one or both sides of the layers before conducting extrusion lamination or dry lamination.

As the extruder for extrusion casting, there can be used, for instance, a single-screw or twin-screw extruder, but it is preferable to use a twin-screw extruder, more preferably a twin-screw extruder having a vent port or vent ports. Use of a twin-screw extruder facilitates compatibilization of the materials in case where the sealing layer is made of a composition, and also betters miscibility of the materials when they are recycled in the production line.

Both of the base layer and the sealing layer can be produced by the steps comprising feeding the material to the hopper of a single- or twin-screw extruder to which a T-die is connected through a gear pump, melting the material in the extruder cylinder, extruding the melted material into a sheet from the T-die and cooling the extrudate by casting rolls. In case of forming the multilayer polyester sheet of the present invention by using a sheet molding machine provided with a side extruder, both layers are coextruded with the sealing layer being attached to one side or both sides of the base layer in the T-die.

Any suitable method may be used for feeding of the materials. For instance, the materials may be fed all together from the main hopper, or part of the materials may be supplied from a side feeder.

The molding temperature of the base layer and the sealing layer is controlled of cylinder, piping, T-die, etc., so that the resin temperature in the extruder cylinder is kept at 270 to 330° C. while the resin temperature in the section from the screw end to the die outlet is kept at 240 to 310° C. The resin temperature can be measured by using a thermocouple provided in each section. In case where two or more units of thermocouple are provided in each section, the arithmetic mean of the measured values is given as resin temperature in that section.

It is preferable that the sheet extruded from the die is cooled quickly so as not to allow advancement of crystallization, and for this purpose, electrostatic pinning or touch-roll casting is preferably used. In these cases, the casting roll surface temperature is controlled to the range of usually 20 to 70° C., preferably 25 to 60° C.

The extruder used for extrusion casting preferably has at least one, preferably two or more vent ports in the cylinder section. In case where an extruder having no vent port is used, the feedstock polyester needs to be dried to a water content of usually not more than 0.01 wt %, preferably not more than 0.005 wt %, and then supplied to the hopper so as to prevent the polyester from being hydrolyzed in the cylinder. In case of using an extruder having one or more vent ports, since the polyester can be dried in the cylinder by evacuating it, the polyester can be supplied without drying, and further the volatilizable impurities such as acetaldehyde contained in the polyester can be reduced in the cylinder. Usually the vent ports are connected to an evacuation system with a vacuum of not higher than 200 mmHg, preferably not higher than 100 mmHg, more preferably not higher than 50 mmHg, still more preferably not higher than 10 mmHg. In case where such vent ports are provided, it is preferred to use a twin-screw extruder because of higher efficiency in reducing volatilizable impurities. The screws of such twin-screw extruder may be either intermeshing type, non-intermeshing type or imperfect intermeshing type.

The multilayer polyester sheet of the present invention, after passed through the casting rolls, usually has its both ends trimmed by a trimming cutter and then rolled up or cut into panels.

In manufacture of the multilayer polyester sheet of the present invention, the sheet edges cut out during molding of the sheet, the fragments cut out of the sheet previously produced to be used for laminate molding, and the surplus portions (skeleton) left out after molding and blanking the multilayer sheet into a container or cover can be recycled as part of the sheet material.

The recycled polyester can be used either for base layer or for sealing layer, but it is preferably used as part of the base layer material. When recycled, the recycled polyester fragments are preferably cut into small pieces or ground. Recycled resin is usually used in a percentage within the range not more than 50 wt %, preferably not more than 40 wt % based on the whole material.

The multilayer polyester sheet of the present invention obtained in the manner described above can be offered to the manufacture of the containers having many excellent properties such as heat resistance, hot-water resistance, heat-sealing property, scent retainability, heat stability, gas barrier property, ultraviolet-screening property, etc. More specifically, by heat-sealing the sealing layers of the sheets of the present invention, there can be obtained a packing pouch with excellent hot-water resistance which is not be deformed or whitened even when subjected to retort treatment with hot water. Also, by drawing the sheet of the present invention, it is possible to produce draw moldings with excellent heat and hot-water resistance which are hardly deformed or whitened even when packed with a hot substance or subjected to retort treatment. It is also possible to provide a container by heat-sealing the multilayer polyester sheet of the present invention. Further, because of high scent retainability like PEN or PET sheets, the sheet of the present invention is suited for use as a packaging material of the type which is directly contacted with a contained stuff which is required not to lose its smell in the packed state, such as carbonated drinks, alcoholics foods, perfumes, cosmetics, etc.

Now, the method of molding articles with the multilayer polyester sheet of the present invention and uses of the molded articles are explained.

Uses of the multilayer sheet of the present invention are not subjected to any specific restrictions, but because of its characteristic properties, the sheet of the present invention is preferably used for heat-sealed type packaging containers.

The multilayer sheet of the present invention can be used either in the form as it is by merely heat-sealing it without conducting thermoforming or as a heat-sealable container after conducting thermoforming such as drawing.

In the case of drawing, any of the known methods for drawing of polyester sheets, such as vacuum forming, air-pressure forming, snap-back forming, reverse draw forming, air-slip forming, plug-assist forming, and combinations of these methods can be used. The draw ratio is usually 0.01 to 10 times, preferably 0.1 to 5 times. Regarding the sheet temperature during draw forming, it is generally preferable that the sheet is heated in such a manner that there is as little temperature unevenness as possible in the thickness direction of the sheet. The sheet-preheating temperature in such draw forming is usually in the range from glass transition temperature of the base layer to 220° C., preferably from glass transition temperature of the base layer to 200° C. When the sheet-preheating temperature falls within the above range, the sheet shows good moldability when it is molded into an article.

In case where a packaging container is manufactured by heat-sealing the sealing layers of the multilayer polyester sheets of the present invention or by heat-sealing a container and a cover each or both made of the multilayer sheet of the present invention, the adhesive strength of the heat-sealed portion (heat-sealing strength) can be optionally set, but it is preferably set not less than 0.5 kgf/15 mm width, more preferably not less than 1.0 kg/15 mm width, still more preferably not less than 2.0 kg/15 mm width, most preferably 2.0 to 4.0 kg/15 mm width. When the heat-sealing strength falls within the above range, the container can be opened with a moderate force.

Heat-sealing strength is determined in the following way. The sealing sides of the sheets to be tested are placed one over the other, sandwiched therebetween with a 0.1 mm thick Teflon sheet and heat-sealed from both sides by a bar sealer. Then the Teflon sheet is removed and a strip-shaped peel strength measuring sample is cut out so that the heat-sealing portion has a width of 15 mm, and T-peel strength of the sample is measured by using a tensile tester. The heat-sealing conditions are variable depending on the sheet thickness and other factors, but usually sealing is conducted at 150 to 230° C. under a pressure of 2 to 7 kg/cm$^2$ for a period of 0.5 to 5 seconds.

The use of the moldings comprising the sheet of the present invention includes a wide variety of packaging and packing materials, for example, standing pouches for retort foods, trays and cups for packaging foods or drinks, their covers, industrial trays for packaging electronic parts, blister packages for packaging specific articles such as tooth brushes, headphones, gifts, etc. Since the moldings comprising the sheet of the present invention have particularly high heat resistance and scent retainability, they are best suited for food containers to be hot filled or subjected to retort treatment, such as containers of carbonated drinks, alcoholics jelly, jam and the like.

The multilayer polyester sheet of the present invention has higher heat and hot-water resistance than the conventional polyester transparent sheets, so that it can well stand retort sterilization treatment with hot water. It also has significantly high heat-sealing strength and transparency. The packing pouches or draw forms obtained by using the sheet of the present invention can be used as the containers having higher heat (and hot water) resistance and better heat-sealing qualities than provided by the conventional polyester transparent sheets. Further, since the sheet of the present invention has excellent recyclability in the production line, little waste is released in the production of the sheet.

EXAMPLES

The present invention is described more particularly by the following examples, but it should be recognized that these examples are merely intended to be illustrative and not to be construed as limiting the scope of the invention. The methods of determination used in the following examples are explained below.

(1) Intrinsic Viscosity

Sample (0.25 g) was dissolved in 25 ml of a phenol/1,1,2,2-tetrachloroethane (1/1 by weight) mixed solvent, and viscosity of this solution was measured at 30° C.

(2) Glass Transition Temperature

The test piece cut out from a feedstock pellet by a stainless razor exerting as little shear as possible was put into an aluminum pan and, after closing the pan, heated at a heating rate of 20° C./min from room temperature till reaching 300° C., maintained at 3000° C. for 3 minutes, then rapidly quenched with liquid nitrogen and again heated at a heating rate of 20° C./min from room temperature till reaching 300° C., under a nitrogen gas atmosphere by using a differential scanning calorimeter TA2000 mfd. by TA Instruments Co., Ltd. Glass transition temperature was determined from the specific heat changing behavior due to glass transition on the calorific value curve at the stage of heating. Specifically, the glass transition temperature was the temperature at the crossing point of the tangential line at the intermediate point of specific heat change and the tangential line at a point before specific heat change.

In case where the base layer or the sealing layer was composed of a two-component composition, glass transition temperature was determined from the following equation, with the components being represented by A and B, respectively:

$$1/Tg = W_A/Tg_A + W_B/Tg_B$$

wherein $Tg_{PEN}$: glass transition temperature of the polyethylene naphthalate resin;

$Tg_{PET}$: glass transition temperature of the polyethylene terephthalate copolymer;

$W_{PEN}$: blending ratio (weight ratio) of the polyethylene naphthalate to the sealing layer;

$W_{PET}$: blending ratio (weight ratio) of the polyethylene terephthalate copolymer to the sealing layer.

(3) Haze

Each sample sheet was cut into a 5 cm×5 cm square piece, and its haze was measured by a digital haze computer Model HGM-2DP mfd. by Suga Test Instruments Co., Ltd.

(4) Hot-Water Deformation Test and Hot-Water Whitening Test

Each sample sheet was immersed in distilled water of a prescribed temperature with no external force applied and left in this state for 30 minutes. The highest temperature to which there took place substantially no deformation of the sheet in this test is called hot-water deformation temperature, and the temperature above which no substantial increase of haze was visually observed is called hot-water whitening temperature. The test was conducted in the temperature range from 80° C. to 96° C., checking the sample at intervals of 2° C. (at every even-numbered temperature). The required values of hot-water deformation temperature and hot-water whitening temperature differ depending on the purpose of use of the sheet, but a temperature exceeding 80° C. is preferably practical for hot filling and a temperature over 90° C. is preferably practical for retort treatment.

(5) Heat-Sealing Strength

Two sample sheets, each having a thickness of 0.1 mm, were placed one over the other, sandwiched therebetween with a Teflon sheet having a thickness of 0.1 mm and heat-sealed by a bar sealer at 180° C. under a pressure of 5 kg/cm$^2$ for 2 seconds. Then the Teflon sheet was removed and a strip-shaped T-peel strength measuring sample was cut out from the laminate so that the heat-sealed portion would have a width of 15 mm. This sample was immersed in 90° C. hot water for 30 minutes with no external force exerted, then quickly taken out and, with moisture wiped out, subjected to the measurement of its T-peel strength (heat-sealing strength) using a tensile tester at a strain rate of 300 mm/min with the initial distance between grips adjusted to 100 mm using test specimens conditioned at 23° C. and 50% relative humidity. The number of test specimens was five in both longitudinal and transverse directions, and the mean was given as heat-sealing strength. The above measurement was also conducted, where possible, on the samples which were deformed by hot water.

The optimal value of heat-sealing strength varies depending on the purpose of use of the sheet; usually a sheet having heat-sealing strength of not less than 2.0 kgf/15 mm width, preferably 2.0 to 4.0 kgf/15 mm width, is suited for uses involving retort treatment.

(6) Recyclability Test 30 wt % of the small fragments of the recycled sample sheet and 70 wt % of the material of the base layer of the sample sheet were supplied to a 30 mm φ g twin-screw extruder and extruded from the T-die to obtain a sheet having a thickness of 0.6 mm, and its haze was measured. The recyclability of the sample was evaluated by following.

○: the measured value of haze was below 10%

Δ: the measured value of haze was 10–15%

X: the measured value of haze was over 15%.

The better the recyclability of the sheet, the more advantageously can it be produced industrially.

The multilayer polyester sheet of the present invention can be offered to practical use when the evaluation of recyclability is ○ or Δ.

Embodiments of the present invention are shown below.

Example 1

Using feedstock polyesters shown in Table 1, the feedstock material of the base layer was supplied to a 65 mm φ twin-screw extruder having three vent ports connected to a 1 mmHg evacuation system while the feedstock material of the sealing layer was supplied to a 30 mm φ twin-screw extruder having two vent ports connected to the 1 mmHg evacuation system, and coextruded from a T-die to obtain a 2-material 3-layer multilayer sheet having a structure and a thickness percentage shown in Table 2.

The whole extrusion rate was 220 kg/hr, the resin temperature at the time of extrusion was 290° C. on the average in the cylinder for both extruders, the average temperature of the section from the screw end to the die outlet was 270° C. and the surface temperature of the casting roll was 40° C.

There were prepared two types of 2-material 3-layer sheet, one with an overall sheet thickness of 0.6 mm and the other with an overall sheet thickness of 0.1 mm. Measurement of haze, hot water deformation test and hot water whitening test were conducted with the 0.6 mm thick sheet and heat-sealing test alone was conducted with the 0.1 mm thick sheet.

Examples 2–17 & Comparative Examples 1-2, 5–9, 13 and 16–18

The same procedures as defined in Example 1 were conducted except that the feedstock polyesters shown in Table 1 were supplied with the compositions shown in Table 2 to obtain the sheets having the thickness ratios shown in Table 2.

Comparative Example 10

A sheet produced by the same procedure as defined in Example 1 was left in 180° C. nitrogen atmosphere for 3 hours, and after crystallization has been completed, the sheet was subjected to the same measurement and testing as defined in Example 1.

Comparative Example 12

It was tried to produce a sheet by the same procedure as defined in Example 1 except that the ratio of the base layer thickness to the sealing layer thickness was changed as shown in Table 2. Because of insufficient mixing, the obtained sheet was whitened.

Comparative Examples 4 and 14

Multilayer sheets were produced by the same procedure as defined in Example 1 except that the whole extrusion rate was changed to 70 kg/hr and that the ratio of the base layer thickness to the sealing layer thickness was changed as shown in Table 2.

Comparative Examples 3 and 15

It was tried to produce a sheet by the same procedure as defined in Example 1 except that the ratio of the base layer thickness to the sealing layer thickness was changed as shown in Table 2, but because of difficulties of sheet molding, it was impossible to obtain a sheet capable of evaluation.

Comparative Example 11

A sheet having the composition as the base layer of Example 2 was made by the same procedure as in Example 1 using a 65 mm φ twin-screw extruder. Further, an aqueous polyester coating solution was prepared using the polyester of the sealing layer of Example 2, and it was tried to form a sealing layer similar to that of Example 2 by applying said coating solution on the base layer, but it was impossible to form the desired sealing layer of a prescribed thickness in a stabilized way.

The results of measurements and tests in the above Examples and Comparative Examples are shown in Table 3.

The degree of crystallinity of the produced multilayer sheets measured by densitometry was not higher than 5% in all cases excepting Comparative Example 10. Also, heat shrinkage percentage at 180° C. of these multilayer sheets was not higher than 2% in all cases.

TABLE 1

Feedstock polyesters

| Code | Dicarboxylic acids (mole %) | Diols other than EG (mole %) | Intrinsic viscosity (dl/g) | Glass Transition temperature (° C.) |
|---|---|---|---|---|
| N-1 | N = 100 | DEG = 1 | 0.66 | 121 |
| N-2 | N/T = 92/8 | DEG = 2 | 0.65 | 116 |
| N-3 | N/T = 70/30 | DEG = 2 | 0.60 | 107 |
| N-4 | N/T = 15/85 | DEG = 2 | 0.65 | 85 |
| N-5 | N/T = 4/96 | DEG = 2 | 0.71 | 79 |
| N-6 | N/T = 70/30 | DEG/CH = 2/8 | 0.61 | 106 |
| N-7 | N/T = 50/50 | DEG/CH = 2/30 | 0.61 | 99 |
| N-8 | N/T = 30/70 | DEG = 10 | 0.69 | 84 |
| T-1 | T = 100 | DEG = 2 | 0.76 | 77 |
| T-2 | T = 100 | DEG/CH = 2/4 | 0.72 | 77 |
| T-3 | T = 100 | DEG/CH = 2/10 | 0.68 | 78 |
| T-4 | T = 100 | DEG/CH = 2/33 | 0.79 | 78 |
| T-5 | T/I = 70/30 | DEG = 2 | 0.70 | 73 |
| T-6 | T = 100 | DEG/NPG = 2/30 | 0.67 | 75 |

N: naphthalenedicarboxylic acid
T: telephthalic acid
I: isophthalic acid
EG: ethylene glycol
DEG: diethylene glycol
CH: cyclohexane dimethanol
NPG: neopentyl glycol

TABLE 2

Composition, Tg and sealing layer thickness ratio of multilayer sheet

| | Base layer | | Sealing layer | | |
|---|---|---|---|---|---|
| | Composition (wt %) | Tg (° C.) | Composition (wt %) | Tg (° C.) | d (%) |
| Ex. 1 | N-1 | 121 | N-6 | 106 | 12 |
| Ex. 2 | N-2 | 116 | N-6 | 106 | 21 |
| Ex. 3 | N-1 | 121 | N-7 | 99 | 5.1 |
| Ex. 4 | N-3 | 107 | N-8 | 84 | 10 |
| Ex. 5 | N-1/N-3 80/20 | 118 | N-7 | 99 | 11 |
| Ex. 6 | N-2/N-4 80/20 | 108 | N-8 | 84 | 10 |
| Comp. Ex. 1 | N-1 | 121 | N-5 | 79 | 11 |
| Comp. Ex. 2 | N-5 | 79 | N-7 | 99 | 10 |
| Comp. Ex. 3 | N-1 | 121 | N-7 | 99 | 0.52 |
| Comp. Ex. 4 | N-1 | 121 | N-8 | 84 | 52 |
| Comp. Ex. 5 | N-2 | 116 | T-1 | 77 | 20 |
| Comp. Ex. 6 | N-2 | 116 | T-2 | 76 | 10 |
| Comp. Ex. 7 | N-4 | 85 | N-8 | 84 | 11 |
| Comp. Ex. 8 | N-1 | 121 | N-1 | 121 | 9.5 |
| Comp. Ex. 9 | T-1 | 77 | T-1 | 77 | 12 |
| Comp. Ex. 10 | T-1 (crystallized) | (77) | T-1 (crystallized) | (77) | 10 |
| Ex. 7 | N-1 | 121 | N-1/T-4 65/35 | 101 | 11 |
| Ex. 8 | N-2 | 116 | N-1/T-4 65/35 | 101 | 11 |
| Ex. 9 | N-1/N-3 90/10 | 119 | N-1/T-4 65/35 | 101 | 9.7 |
| Ex. 10 | N-1 | 121 | N-1/T-4 75/25 | 106 | 12 |
| Ex. 11 | N-1 | 121 | N-1/T-4 30/70 | 87 | 10 |
| Ex. 12 | N-1 | 121 | N-1/T-1 65/35 | 100 | 11 |
| Ex. 13 | N-1 | 121 | N-1/T-2 65/35 | 100 | 13 |
| Ex. 14 | N-1 | 121 | N-1/T-3 65/35 | 101 | 12 |
| Ex. 15 | N-1 | 121 | N-1/T-5 65/35 | 100 | 14 |
| Ex. 16 | N-1 | 121 | N-1/T-6 | 99 | 12 |

TABLE 2-continued

Composition, Tg and sealing layer thickness ratio of multilayer sheet

| | Base layer | | Sealing layer | | |
|---|---|---|---|---|---|
| | Composition (wt %) | Tg (° C.) | Composition (wt %) | Tg (° C.) | d (%) |
| Ex. 17 | N-3 | 107 | N-1/T-4 65/35 | 101 | 10 |
| Comp. Ex. 12 | N-1 | 121 | N-1/T-4 65/35 | 115 | 10 |
| Comp. Ex. 13 | N-1 | 121 | N-1/T-4 90/10 | 80 | 12 |
| Comp. Ex. 14 | N-1 | 121 | N-1/T-4 10/90 | 101 | 41 |
| Comp. Ex. 15 | N-1 | 121 | N-1/T-4 65/35 | 101 | 0.64 |
| Comp. Ex. 16 | N-5 | 79 | N-1/T-4 65/35 | 106 | 10 |
| Comp. Ex. 17 | N-7 | 99 | N-1/T-4 75/25 | 101 | 11 |
| Comp. Ex. 18 | N-1/T-4 75/25 | 106 | N-1/T-4 65/35 | 106 | 12 |
| | | | 75/25 | | | d = ((overall thickness of sealing layer)/(thickness of base layer)) × 100 (%)

TABLE 3

Results of measurements and tests of multilayer sheets

| Items of evaluation Unit | Haze % | Hot water deforming temperature °C. | Hot water whitening temperature °C. | Heat-sealing strength Kg/15 mm | Recyclability |
|---|---|---|---|---|---|
| Ex. 1 | 2.2 | 94 | ≥96 | 2.3 | ○ |
| Ex. 2 | 1.4 | 94 | ≥96 | 2.6 | ○ |
| Ex. 3 | 2.4 | 94 | ≥96 | 3.3 | ○ |
| Ex. 4 | 2.9 | 92 | 94 | 3.0 | ○ |
| Ex. 5 | 1.7 | 94 | ≥96 | 3.5 | ○ |
| Ex. 6 | 1.9 | 92 | 94 | 3.0 | ○ |
| Comp. Ex. 1 | 3.1 | 92 | ≥96 | 0.8 | X |
| Comp. Ex. 2 | 2.8 | 84 | 86 | Unmeasurable* | X |
| Comp. Ex. 4 | 3.5 | 84 | 88 | 4.5< | X |
| Comp. Ex. 5 | 4.1 | ≤80 | 84 | 0.6 | X |
| Comp. Ex. 6 | 2.9 | 82 | 86 | 1.2 | X |
| Comp. Ex. 7 | 1.5 | 86 | 92 | Unmeasurable* | X |
| Comp. Ex. 8 | 1.1 | ≥96 | ≥96 | 0.9 | ○ |
| Comp. Ex. 9 | 1.0 | ≤80 | 84 | 0.8 | ○ |
| Comp. Ex. 10 | 86 | ≥96 | Unable to evaluate | Could not be sealed | ○ |
| Ex. 7 | 1.6 | ≥96 | ≥96 | 3.1 | ○ |
| Ex. 8 | 1.4 | 94 | ≥96 | 3.3 | ○ |
| Ex. 9 | 3.2 | 94 | ≥96 | 3.5 | ○ |
| Ex. 10 | 1.5 | ≥96 | ≥96 | 2.6 | ○ |
| Ex. 11 | 1.8 | 90 | 94 | 4.0 | ○ |
| Ex. 12 | 1.0 | 92 | ≥96 | 2.1 | ○ |
| Ex. 13 | 1.4 | 92 | ≥96 | 2.2 | ○ |
| Ex. 14 | 1.3 | 92 | ≥96 | 2.8 | ○ |
| Ex. 15 | 2.3 | 92 | ≥96 | 2.9 | ○ |
| Ex. 16 | 3.1 | 92 | ≥96 | 3.0 | ○ |
| Ex. 17 | 2.0 | 86 | 94 | 3.0 | Δ |
| Comp. Ex. 12 | 30 | ≥96 | Unable to evaluate | 1.3 | Δ |
| Comp. Ex. 13 | 1.4 | 84 | 84 | 4.5< | X |
| Comp. Ex. 14 | 2.2 | 82 | ≥96 | 4.5< | X |
| Comp. Ex. 16 | 2.1 | ≤80 | 86 | 3.2 | X |
| Comp. Ex. 17 | 2.5 | 82 | ≥96 | 4.5< | X |
| Comp. Ex. 18 | 1.9 | 84 | 84 | 4.5< | ○ |

*It was hard to make measurement because of large deformation when heat-sealed.

What is claimed is:

1. A multilayer polyester sheet comprising:
    a base layer comprising a thermoplastic polyester resin (A) having a glass transition temperature of not less than 80° C., and
    a sealing layer comprising a thermoplastic polyester resin (B) having a glass transition temperature of not less than 70° C. and laminated on at least one side of said base layer,
    wherein the glass transition temperature of thermoplastic polyester resin (B) is at least 5° C. lower than the glass transition temperature of thermoplastic polyester resin (A),
    said polyester sheet being a substantially non-stretched transparent sheet in which the heat shrinkage at 180° C. is not more than 5%, and further satisfying the following:
    (1) said thermoplastic polyester resin (A) comprising a dicarboxylic acid moiety comprising 7 to 100 mole % of a naphthalenedicarboxylic acid and 93 to 0 mole of terephthalic acid, and a diol moiety comprising ethylene glycol;
    (2) said thermoplastic polyester resin (B) comprising a dicarboxylic acid moiety comprising 4 to 90 mole % of naphthalenedicarboxylic acid and 96 to 10 mole % of terephthalic acid, and a diol moiety comprising 50 to 97 mole % of ethylene glycol and 50 to 3 mole % of at least one diol selected from the group consisting of cyclohexane dimethanol, diethylene glycol and 1,4-butanediol;
    (3) the haze of the whole multilayer polyester sheet is not more than 10%; and
    (4) the total thickness of the sealing layer is 1 to 30% of the thickness of the base layer.

2. A multilayer polyester sheet according to claim 1, wherein said thermoplastic polyester resin (A) comprises a dicarboxylic acid moiety comprising 10 to 100 mole % of naphthalenedicarboxylic acid and 90 to 0 mole % of terephthalic acid and a diol moiety comprising ethylene glycol; and the thermoplastic polyester resin (B) comprises a dicarboxylic acid moiety comprising 8 to 90 mole % of naphthalenedicarboxylic acid and 92 to 10 mole % of terephthalic acid, and a diol moiety comprising 60 to 90 mole % of ethylene glycol and 40 to 10 mole % of at least one diol selected from the group consisting of cyclohexane dimethanol, diethylene glycol and 1,4-butanediol.

3. A multilayer polyester sheet according to claim 1, wherein the sealing layer comprises a composition comprising 20 to 80 wt % of a polyethylene naphthalate resin and 80 to 20 wt % of a polyethylene terephthalate copolymer.

4. A multilayer polyester sheet according to claim 1, wherein the degree of crystallinity of the whole multilayer polyester sheet is not more than 15%.

5. A multilayer polyester sheet according to claim 1, wherein the intrinsic viscosity of the polyester used for the base layer and the polyester used for the sealing layer are both 0.5 to 1.3 dl/g.

6. A multilayer polyester sheet according to claim 1, wherein the glass transition temperature of the thermoplastic resin (B) is not more than 120° C.

7. A multilayer polyester sheet according to claim 1, wherein the oxygen permeability of the sheet is not more than 4.5 cc mm/[$m^2$·day·atm].

8. A multilayer polyester sheet according to claim 1, wherein the naphthalenedicarboxylic acid is 2,6-naphthalenedi-carboxylic acid.

9. A multilayer polyester sheet according to claim 1, wherein the diol moiety of the thermoplastic polyester resin (B) comprises ethylene glycol and cyclohexane dimethanol.

10. A multilayer polyester sheet according to claim 1, wherein the diol moiety of the thermoplastic polyester resin (B) comprises ethylene glycol and 1,4-butanediol.

11. A multilayer polyester sheet according to claim 3, wherein the copolymerizing moiety of the polyethylene terephthalate copolymer is cyclohexane dimethanol.

12. A multilayer polyester sheet according to claim 3, wherein Tg defined by the following formula (1) is 90 to 120° C.:

$$1/Tg = W_{PEN}/Tg_{PEN} + W_{PET}/Tg_{PET} \tag{1}$$

wherein $Tg_{PEN}$: glass transition temperature of the polyethylene naphthalate resin;

$Tg_{PET}$: glass transition temperature of the polyethylene terephthalate copolymer;

$W_{PEN}$: blending ratio (weight ratio) of the polyethylene naphthalate to the sealing layer;

$W_{PET}$: blending ratio (weight ratio) of the polyethylene terephthalate copolymer to the sealing layer.

13. A multilayer polyester sheet according to claim 1, produced by an extrusion lamination, coextrusion or dry lamination.

14. A packaging container produced by heat-sealing the multilayer polyester sheet defined in claim 1.

15. A molded article obtained by drawing the multilayer polyester sheet defined in claim 1.

16. A heat-sealable container cover comprising the multilayer polyester sheet defined in claim 1.

17. A packaging container produced by heat-sealing a cover to a draw-formed article obtained by drawing the multilayer polyester sheet defined in claim 1.

18. A packaging container according to claim 14, which further has a heat-sealing strength of 0.5 kgf/15 mm width.

19. A packaging container according to claim 17, which further has a heat-sealing strength of 0.5 kgf/15 mm width.

20. The multilayer polyester sheet according to claim 1, wherein the glass transition temperature of thermoplastic polyester resin (B) is at least 10° C. lower than the glass transition temperature of thermoplastic polyester resin (A).

21. The multilayer polyester sheet according to claim 20, wherein the glass transition temperature of thermoplastic polyester resin (B) is at least 15° C. lower than the glass transition temperature of thermoplastic polyester resin (A).

* * * * *